United States Patent
Savir et al.

(10) Patent No.: US 11,704,677 B2
(45) Date of Patent: Jul. 18, 2023

(54) CUSTOMER SUPPORT TICKET AGGREGATION USING TOPIC MODELING AND MACHINE LEARNING TECHNIQUES

(71) Applicant: EMC IP Holding Company LLC, Hopkinton, MA (US)

(72) Inventors: Amihai Savir, Sansana (IL); Omer Sagi, Mazkeret Batya (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 673 days.

(21) Appl. No.: 16/257,326

(22) Filed: Jan. 25, 2019

(65) Prior Publication Data

US 2020/0242623 A1 Jul. 30, 2020

(51) Int. Cl.
G06Q 30/016 (2023.01)
G06F 40/30 (2020.01)
(Continued)

(52) U.S. Cl.
CPC ........... *G06Q 30/016* (2013.01); *G06F 40/30* (2020.01); *G06V 10/82* (2022.01);
(Continued)

(58) Field of Classification Search
CPC combination set(s) only.
See application file for complete search history.

(56) References Cited

U.S. PATENT DOCUMENTS

2018/0032874 A1* 2/2018 Sńchez Charles .... G06F 16/367
2018/0365417 A1* 12/2018 Wu ......................... G06N 20/00
(Continued)

OTHER PUBLICATIONS

Amin, K., Kapetanakis, S., Althoff, KD., Dengel, A., Petridis, M., "Answering with Cases: A CBR Approach to Deep Learning", [online], Oct. 2018 [retrieved on May 3, 2022] Retrieved from the Internet: <Answering with Cases: A CBR Approach to Deep Learning | SpringerLink> (Year: 2018).*

W. Zhou, L. Tang, T. Li, L. Shwartz and G. Y. Grabarnik, "Resolution recommendation for event tickets in service management,", 2015, pp. 287-295, doi: 10.1109/INM.2015.7140303. Retrieved from the Internet:https://ieeexplore.ieee.org/stamp/stamp.jsp?tp=&arnumber=8536108 (Year: 2015).*

(Continued)

*Primary Examiner* — Lynda Jasmin
*Assistant Examiner* — Ehrin L Pratt
(74) *Attorney, Agent, or Firm* — Ryan, Mason & Lewis, LLP (57) ABSTRACT

Techniques are provided for customer support ticket aggregation. One method comprises obtaining a customer support ticket; extracting a topic of the customer support ticket using a topic model based on natural language processing techniques; converting the customer support ticket to a topic vector representation that identifies the extracted topic and comprises a list of words describing the topic based on a collection of processed customer support tickets; extracting features from the customer support ticket; generating a fingerprint for the customer support ticket that comprises the topic vector representation and the extracted features; applying the fingerprint to a machine learning similarity model that compares the fingerprint to fingerprints of processed customer support tickets from the collection of processed customer support tickets; and identifying a processed customer support ticket from the collection of processed customer support tickets that is related to the customer support ticket.

20 Claims, 7 Drawing Sheets

(51) Int. Cl.
   *G06V 30/19*       (2022.01)
   *G06V 10/82*       (2022.01)
   *G06V 30/262*      (2022.01)
   *G06F 18/22*       (2023.01)
   *G06N 20/00*       (2019.01)

(52) U.S. Cl.
   CPC ........ *G06V 30/19173* (2022.01); *G06F 18/22* (2023.01); *G06N 20/00* (2019.01); *G06V 30/274* (2022.01)

(56) References Cited

U.S. PATENT DOCUMENTS

| | | | | |
|---|---|---|---|---|
| 2019/0132191 | A1* | 5/2019 | Mann | G06N 5/046 |
| 2019/0286700 | A1* | 9/2019 | Jayaraman | G06N 3/0454 |
| 2019/0325323 | A1* | 10/2019 | Walthers | G06N 7/005 |
| 2019/0347148 | A1* | 11/2019 | Gomes Pereira | G06F 11/3466 |
| 2020/0034689 | A1* | 1/2020 | Andrassy | G06F 16/00 |
| 2020/0089761 | A1* | 3/2020 | Guerra | G06N 20/10 |

OTHER PUBLICATIONS

Goldberg et al., "word2vec Explained: Deriving Mikolov et al.'s Negative-Sampling Word-Embedding Method", arXiv:1402.3722 (Cornell University; Feb. 15, 2014).

Mikolov et al., "Efficient Estimation of Word Representations in VectorSpace," arXiv:1301.3781 (Cornell University; Jan. 16, 2013).

Neculoiu at el., "Learning Text Similarity with Siamese Recurrent Networks," Proceedings of the 1st Workshop on Representation Learning for NLP, pp. 148-157, Berlin, Germany (2016).

"Improving the Future by Learning from the Past", downloaded from https://www.answeriq.com/howitworks on Jan. 13, 2019.

Dominic Wellington, "How to Stop Chasing Tickets", downloaded from https://www.moogsoft.com/blog/how-to-stop-chasing-tickets/ on Jan. 13, 2019.

"Smart Ticketing", downloaded from https://www.bigpanda.io/tag/smart-ticketing/ on Jan. 13, 2019.

* cited by examiner

CUSTOMER SUPPORT TICKET AGGREGATION USING TOPIC MODELING AND MACHINE LEARNING TECHNIQUES

FIELD

The field relates generally to the processing of customer support issues.

BACKGROUND

Customer support requests are often documented using tickets. In the field of IT (Information Technology), for example, a ticketing system is often used to manage IT tickets. There is often a large number of duplicate and/or otherwise related tickets. For example, in the IT context, related tickets are often encountered when an exchange server fails, or when a failure occurs with a single sign on process. In these types of situations, a number of users will typically submit independent customer support requests, with many users often describing the nature of the request differently, although the root cause for the multiple requests is often the same or at least related.

A need therefore exists for improved techniques for aggregating multiple related customer support issues, for example, as part of a root cause analysis for IT issues under investigation. In this manner, related customer support issues can be handled together.

SUMMARY

In one embodiment, a method comprises obtaining a customer support ticket; extracting a topic of the customer support ticket using a topic model based on natural language processing techniques; converting the customer support ticket to a topic vector representation using the topic model, wherein the topic vector representation identifies the extracted topic and comprises a list of words describing the topic based on a collection of processed customer support tickets; extracting one or more features from the customer support ticket; generating a fingerprint for the customer support ticket that comprises the topic vector representation and the one or more extracted features; applying the fingerprint for the customer support ticket to a machine learning similarity model that compares the fingerprint for the customer support ticket to fingerprints of processed customer support tickets from the collection of processed customer support tickets; and identifying at least one processed customer support ticket from the collection of processed customer support tickets that is related to the customer support ticket, based on a predefined similarity metric.

In some embodiments, the topic model distinguishes different words used to describe related incidents and is trained over the collection of processed customer support tickets. In at least one embodiment, the machine learning similarity model comprises at least two Siamese networks that determine whether at least two applied fingerprints of customer support tickets are related, based on the predefined similarity metric.

The identified related processed customer support tickets can be previously processed customer support tickets and/or customer support tickets that are processed at substantially the same time as the obtained customer support ticket.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for customer support ticket aggregation.

Effective IT support is crucial for many business organizations, with a goal of increasing user satisfaction and loyalty to an organization. When a user reports a field issue (such as a failed login attempt, email failures, web issues, data unavailability and/or connectivity issues), IT service personnel are often tasked with providing a root cause analysis of an occurrence of the field issue. Providing a root cause analysis typically requires the attention of experienced technical engineers to investigate the issue by joining information from different sources (such as log events and configuration files), often at a significant cost. In some cases, the root cause investigations can last hours, and even days, when an unfamiliar or complex issue occurs.

Existing IT management systems, such as the ServiceNow™ IT service management tool, commercially available from ServiceNow, Inc., typically enable textual queries for locating items of interest (e.g., log content, system documentations, configuration properties, and labels) as part of a root cause investigation. However, these search tools assume that the available data is of a high quality and that the descriptions of field issues submitted by users are semantically accurate. In reality, these conditions are not met and the investigation becomes a frustrating and time-consuming task.

An incoming user ticket that points to an issue, or a system failure that has already been resolved by other prior issues, might be investigated as an unknown issue if the investigator cannot identify those prior similar issues. Therefore, investigators can spend long hours working on already resolved issues that could otherwise be resolved in a few minutes.

In addition, IT tickets are often comprised of large files with numerous log events from different components of the system. Detecting an event or sequence of events within the processed files that led to a particular system failure is often a challenging task. In some cases, users get an erroneous root cause analysis. In other cases, issues are not resolved at all. These can result in a low Employee Net Promoter Score (eNPS).

Furthermore, different support engineers may have a different semantic interpretation for the same or related customer issues. For example, assume that a first user titles a ticket as 'no access to salesforce application,' while a second user encounters the same issue, but is viewing the issue as a 'single sign on stuck' issue. Existing ticketing systems typically will not allow the experience of the first user to benefit the second user.

In addition, while experienced support engineers may have many advantages when identifying a root cause of a familiar issue and knowing a most probable 'hot spot' in many user issues, experience can be an obstacle when encountering unique or unfamiliar issues (e.g., for which their root cause can be derived only from rare log messages and overlooked data sources).

In one or more embodiments, customer support ticket aggregation techniques are provided for aggregating related customer support tickets, such as Information Technology customer support tickets, using topic modeling and machine learning techniques. In some embodiments, a fingerprint is used to represent a given customer support ticket. An exemplary fingerprint comprises a topic vector extracted from the given customer support ticket using a topic model, and one or more features extracted from the given customer support ticket. The fingerprint is applied to a machine learning similarity model that compares the fingerprint to fingerprints of processed customer support tickets. One or more related processed customer support tickets are identified based on a predefined similarity metric.

In at least one embodiment, the disclosed techniques for aggregating multiple related customer support issues provide a tool that automatically recommends a root cause analysis for customer service tickets under investigation. In some embodiments, related customer support issues are considered related when the customer support issues have the same or related root causes. By leveraging data mining, information retrieval and/or machine learning approaches, the disclosed techniques identify similar past and/or contemporaneous tickets. In this manner, a number of distinct new tickets to be processed is reduced. In some embodiments, multiple related tickets are collapsed into a single ticket or identified as a related set of tickets that includes a description of the issue.

Figure 1:
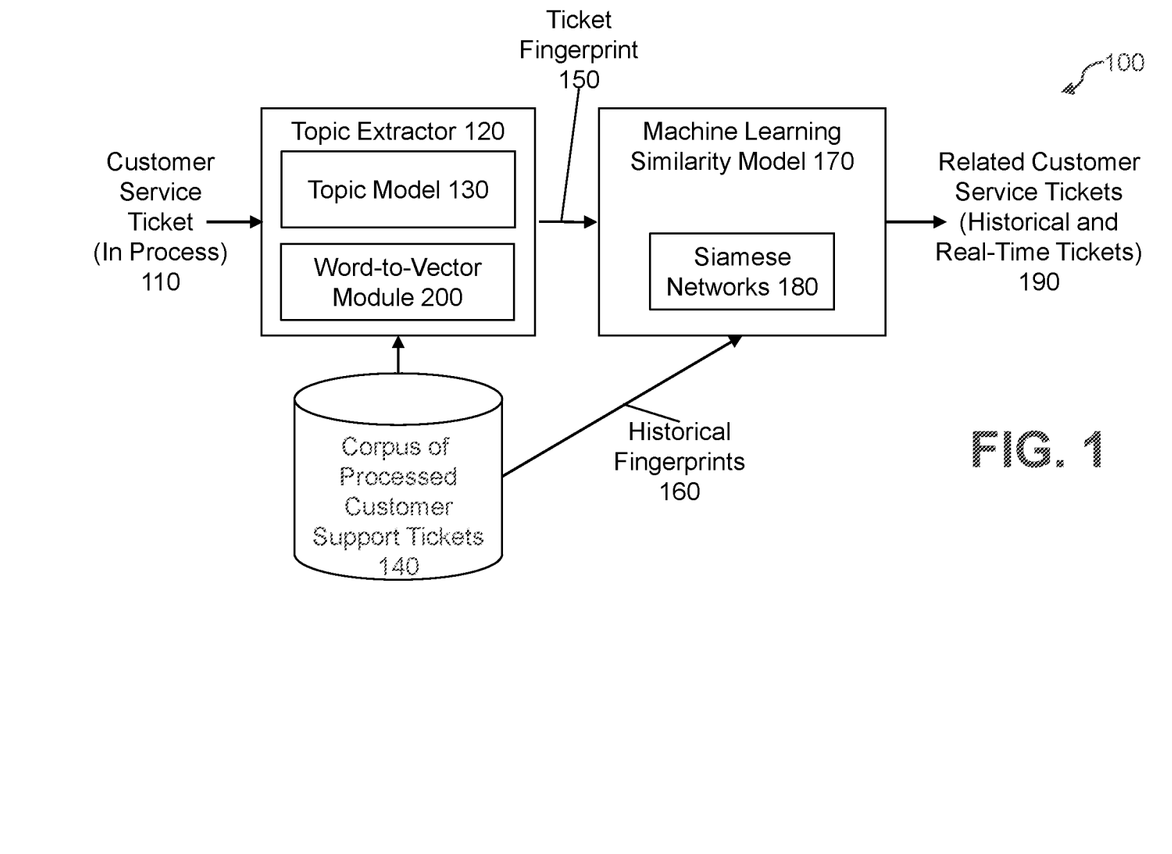
FIG. 1 illustrates an exemplary customer support ticket aggregation system, according to an embodiment of the disclosure.

FIG. 1 illustrates an exemplary customer support ticket aggregation system 100, according to an embodiment of the disclosure. Generally, the exemplary customer support ticket aggregation system 100 employs machine learning techniques that, given one or more customer support tickets, identify past or contemporaneous customer support tickets that are likely to be related, if any. Among other benefits, the customer support ticket aggregation system 100 reduces the number of duplications and related tickets in the customer support ticket aggregation system 100, allowing a support team to address an incident more efficiently.

In some embodiments, the exemplary customer support ticket aggregation system 100 is a content-based recommender system that, given a new user ticket (e.g., a customer support incident), will search for similar issues (tickets) that have been processed by the system and that are likely to be related. Recommendations are made by retrieving 'candidate' tickets from a designated knowledge base and by using machine-learning algorithms that recommend customer support ticket(s) that are most relevant to the incoming issue in terms of a root cause analysis investigation. For example, the exemplary customer support ticket aggregation system 100 will decide if a given input ticket is part of an existing group of (one or more) tickets that the exemplary customer support ticket aggregation system 100 has processed in the past or is concurrently processing at substantially the same time as the given input ticket, for example, based on a predefined threshold that determines the sensitivity of the exemplary customer support ticket aggregation system 100.

As shown in FIG. 1, the exemplary customer support ticket aggregation system 100 comprises a topic extractor 120 that processes one or more in-process customer service tickets 110 (also referred to herein as customer support tickets 110) and a corpus of processed customer support tickets 140, and generates a ticket fingerprint 150, as discussed further below in conjunction with FIG. 3. In one or more embodiments, the exemplary corpus of processed customer support tickets 140 comprises processed customer support tickets that are labeled with the corresponding root cause identified by the root cause analysis.

The exemplary topic extractor 120 comprises a topic model 130 and a word-to-vector module 200, as discussed further below in conjunction with FIG. 2. Generally, in some embodiments, the exemplary topic model 130 employs Natural Language Processing (NLP) topic modeling, such as LDA (Latent Dirichlet Allocation) techniques to automatically extract a topic of a given customer support ticket. Generally, a topic model 130 can distinguish words that are used to describe the same incidents, in a known manner. In some embodiments, the topic model 130 and word-to-vector module 200 extract sensible features and/or topics from the customer service tickets 110, 140. Topic modeling can be considered as an abstract module that processes textual inputs and provides a set of features (e.g., some features may be generated by the LDA techniques and some features may be generated by the word-to-vector module 200, which can be concatenated to provide a representation of a given customer service ticket that is also comparable to other customer service tickets).

The ticket fingerprint 150 is processed by a machine learning similarity model 170, discussed further below in conjunction with FIG. 4, that identifies one or more related customer service tickets 190 (e.g., historical tickets and tickets being processed in real-time). In at least one embodiment, the ticket fingerprint 150 may comprise, for example, a vector representation of the corresponding service issue that can be digested by the machine learning similarity model 170.

As shown in FIG. 1, the exemplary machine learning similarity model 170 also processes historical fingerprints 160 comprising fingerprints of the customer support ticket from the corpus of processed customer support tickets 140. In some embodiments, the machine learning similarity model 170 employs two or more Siamese networks 180, also discussed further below in conjunction with FIG. 4.

Figure 2:
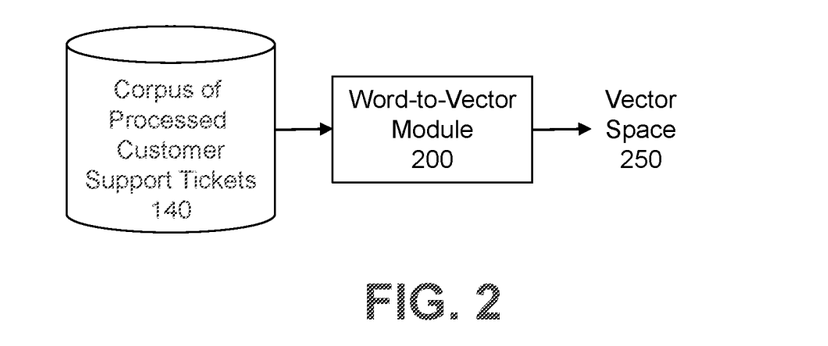
FIG. 2 illustrates the word-to-vector module of FIG. 1 in further detail, according to some embodiments.

FIG. 2 illustrates the word-to-vector module 200 of FIG. 1 in further detail, according to some embodiments. The exemplary word-to-vector module 200 is trained over the corpus of processed customer support tickets 140, to thereby allow a better representation of the words in the domain. Generally, word2vec is a group of related models that are used to produce word embeddings (where a word embedding is a collective name for a set of language modeling and feature learning techniques in natural language processing where words or phrases from the vocabulary are mapped to vectors of real numbers).

In some embodiments, the exemplary word-to-vector module 200 is implemented as a two-layer neural network trained to reconstruct linguistic contexts of words. A word2vec model takes as its input a large corpus of text, such as the corpus of processed customer support tickets 140. In some embodiments, the word-to-vector module 200 will process the output of the topic model 130 as a training mechanism. As shown in FIG. 2, the exemplary word-to-vector module 200 produces a vector space 250, for example, having several hundred dimensions, with each unique word in the corpus of processed customer support tickets 140 being assigned a corresponding vector in the space. Word vectors are positioned in the vector space such that words that share common contexts in the corpus of processed customer support tickets 140 are located in proximity to one another in the vector space 250. In this manner, more complex similarities can be found between customer support tickets.

For a more detailed discussion of suitable techniques for the word-to-vector module 200, see, for example, Tomas Mikolov et al., "Efficient Estimation of Word Representations in Vector Space," arXiv:1301.3781 (Cornell University; Jan. 16, 2013); and/or Yoav Goldberg and Omer Levy, "Word2vec Explained: Deriving Mikolov et al.'s Negative-Sampling Word-Embedding Method," arXiv:1402.3722 (Cornell University; Feb. 15, 2014), each incorporated by reference herein in its entirety.

Figure 3:
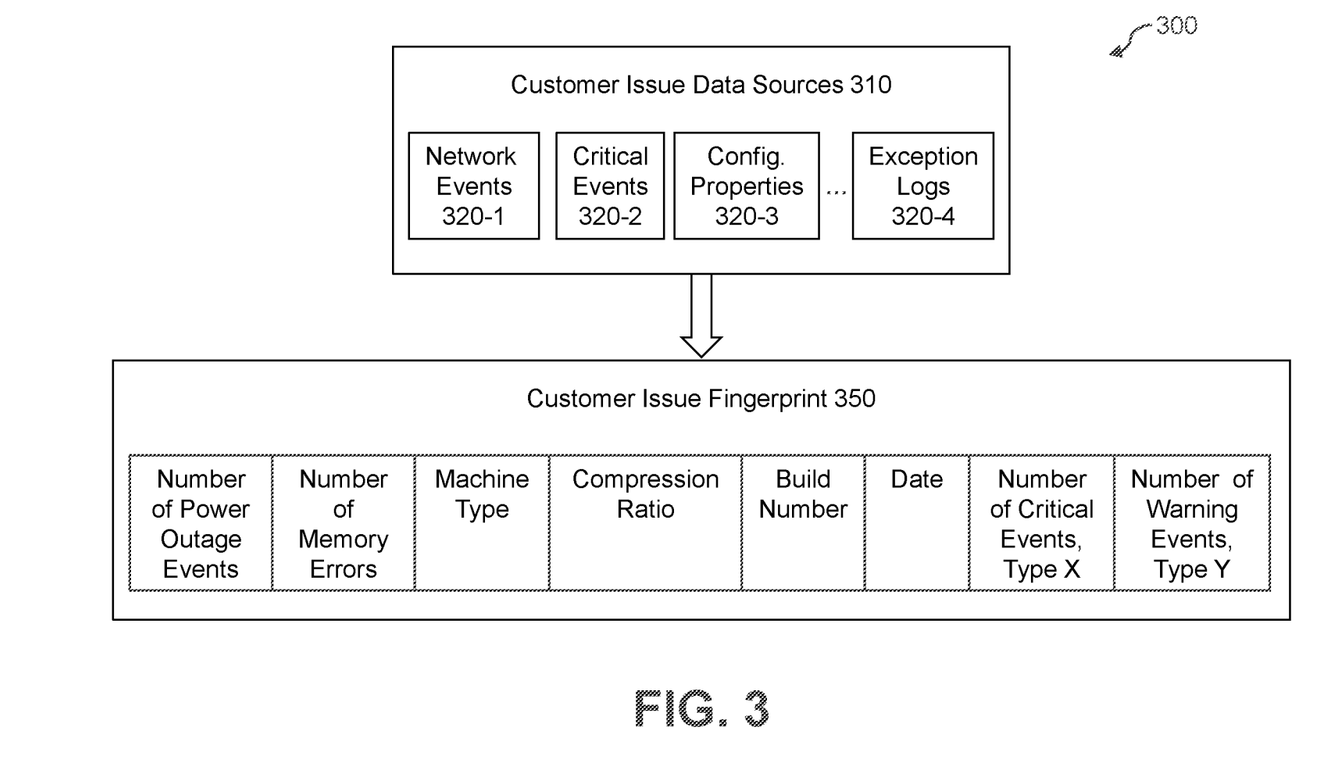
FIG. 3 illustrates a generation of a customer issue fingerprint from a number of exemplary customer issue data sources, according to at least one embodiment.

FIG. 3 illustrates a generation 300 of a customer issue fingerprint 350 from a number of exemplary customer issue data sources 310, according to at least one embodiment. In the example of FIG. 3, the exemplary customer issue data sources 310 comprise network events 320-1; critical events 320-2; configuration properties 320-3; and/or exception logs 320-4. The exemplary customer issue data sources 310 are processed to extract the exemplary customer issue fingerprint 350.

In the example of FIG. 3, the exemplary customer issue fingerprint 350 comprises a number of power outage events, a number of memory errors, a machine type, a compression ratio, a build number, a date, a number of critical events of type X and a number warning events of type Y.

In some embodiments, the customer issue fingerprint 350 of FIG. 3 is added with the topic vector extracted from the given customer support ticket using the topic model 130 to generate the ticket fingerprint 150 of FIG. 1.

As noted above, the corpus of processed customer support tickets 140 comprises a set of historical fingerprints 160 of past customer service issues. Each ticket fingerprint 150 and historical fingerprint 160 may comprise, for example, a vector representation of the corresponding service issue that can be digested by the machine learning similarity model 170. The fingerprints 150, 160, created from a data description of a given customer support issue and corresponding files using feature engineering techniques, comprise relevant characteristics of the customer support issue. For example, the fingerprints 150, 160 may comprise log messages, a bag of words of the description, a version identifier, a date of occurrence, a username of the user, additional user details (e.g., a manager and business unit), a geo-location of the user, a site of the user, and/or a network identifier of the user.

Figure 4:
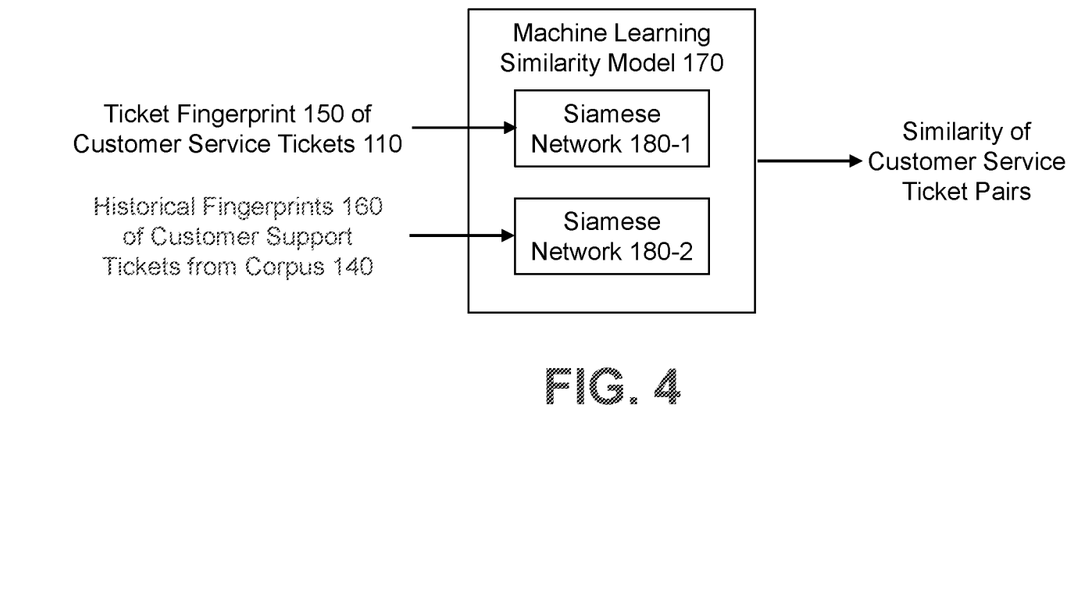
FIG. 4 illustrates the machine learning similarity model of FIG. 1 in further detail, according to one embodiment.

FIG. 4 illustrates the machine learning similarity model 170 of FIG. 1 in further detail, according to one embodiment. As shown in FIG. 4, the exemplary machine learning similarity model 170 is comprised of a pair of Siamese networks 180-1 and 180-2, and processes the ticket fingerprint 150 of a given customer service ticket 110 being processed and historical fingerprints 160 of customer support tickets that have already been processed from the corpus of processed customer support tickets 140.

In some embodiments, the exemplary machine learning similarity model 170 is trained to determine the probability that two customer support tickets are related to each other. The exemplary machine learning similarity model 170 applies the fingerprints of two customer support tickets as inputs to the pair of Siamese networks 180-1 and 180-2. For example, Siamese network 180-1 can process the ticket fingerprint 150 of the given customer service ticket 110, and Siamese network 180-2 can process, in turn, each of the historical fingerprints 160 from the corpus of processed customer support tickets 140. In this manner, over time, the ticket fingerprint 150 of the given customer service ticket 110 is compared, in turn, to each of the historical fingerprints 160 from the corpus of processed customer support tickets 140.

Generally, the pair of Siamese networks 180 can be implemented as two substantially identical LSTM (Long Short-Term Memory) models. See, for example, Paul Neculoiu at el., "Learning Text Similarity with Siamese Recurrent Networks," (2016), incorporated by reference herein in its entirety. The final layers of the Siamese networks 180-1 and 180-2 are applied to a contrastive loss function that calculates a similarity between the two fingerprints 150, 160, based on predefined similarity criteria. In this manner, the outputs of the pair of Siamese networks 180-1 and 180-2 are combined to provide an answer as to whether the two applied fingerprints (e.g., the ticket fingerprint 150 with respect to each of the historical fingerprints 160) are related (e.g., substantially the same). The model training can be done in a supervised manner in cases where past relations are retrievable from a ticket tracking system (e.g., the ServiceNow™ IT service management tool).

Figure 5:
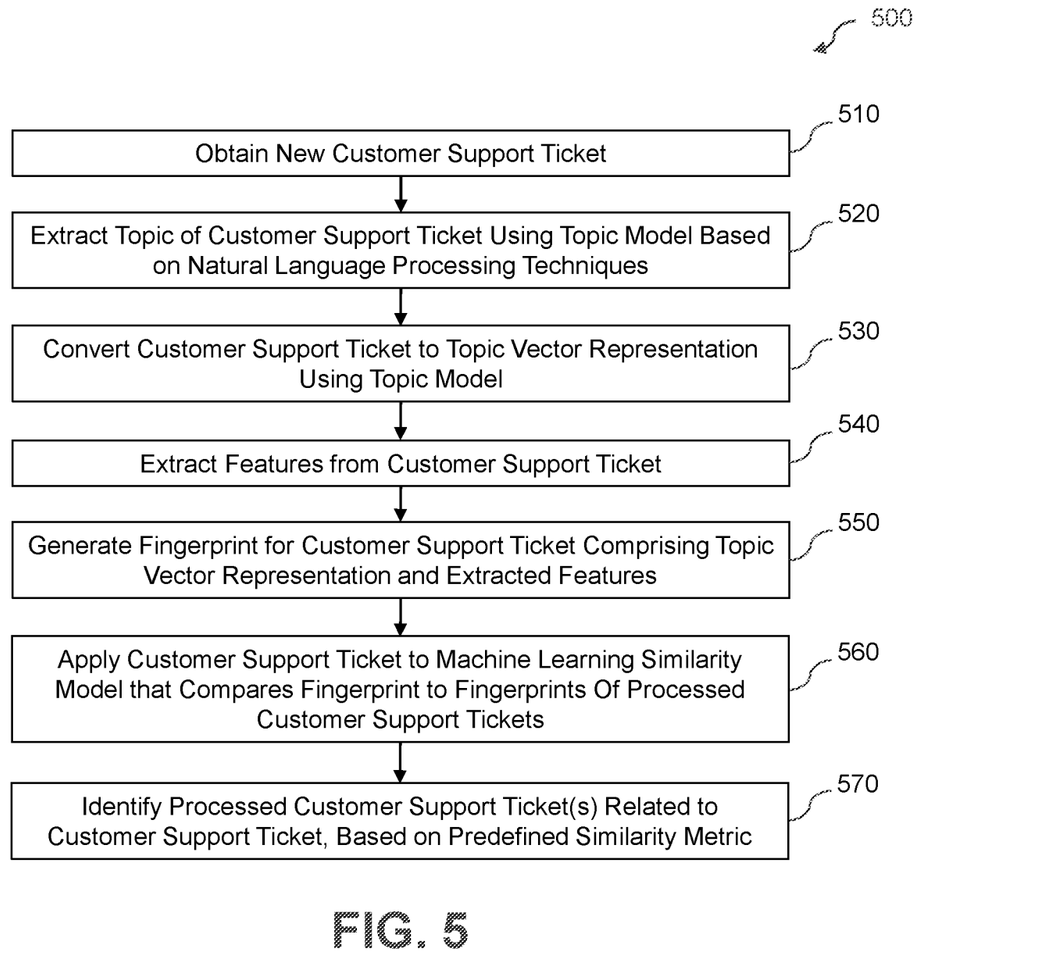
FIG. 5 is a flow chart illustrating an exemplary implementation of a customer support ticket aggregation process, according to one embodiment of the disclosure.

FIG. 5 is a flow chart illustrating an exemplary implementation of a customer support ticket aggregation process 500, according to one embodiment of the disclosure. As shown in FIG. 5, the exemplary customer support ticket aggregation process 500 initially obtains a new customer support ticket 110 during step 510. During step 520, a topic of the customer support ticket 110 is extracted using the topic model 130 based on NLP techniques.

The customer support ticket 110 is then converted to a topic vector representation during step 530 using the topic model 130. The topic vector representation identifies the extracted topic and comprises a list of words describing the topic based on the corpus of processed customer support tickets 140. One or more features are extracted from the customer support ticket 110 during step 540, as discussed further below in conjunction with FIG. 3.

A ticket fingerprint 150 is generated for the customer support ticket 110, comprising the topic vector representation and the one or more extracted features, during step 550. The ticket fingerprint 150 for the customer support ticket 110 is applied during step 560 to the machine learning similarity model 170 that compares the ticket fingerprint 150 for the customer support ticket 110 to historical fingerprints 160 of processed customer support tickets from the corpus of processed customer support tickets 140.

Finally, one or more processed customer support tickets from the corpus of processed customer support tickets 140 are identified during step 570 that are related to the customer support ticket 110, for example, based on a predefined similarity metric.

The particular processing operations and other network functionality described in conjunction with the flow diagrams of FIG. 5 are presented by way of illustrative example only, and should not be construed as limiting the scope of the disclosure in any way. Alternative embodiments can use other types of processing operations to apply features extracted from authentication data for determining a behavior score at an endpoint device and to evaluate access requests based on the behavior score. For example, the ordering of the process steps may be varied in other embodiments, or certain steps may be performed concurrently with one another rather than serially.

In one or more embodiments, customer support ticket aggregation techniques are provided for aggregating related customer support tickets using topic modeling and machine learning techniques. In some embodiments, a fingerprint is used to represent a given customer support ticket and comprises, for example, a topic vector extracted from the given customer support ticket using a topic model, and one or more features extracted from the given customer support ticket. The fingerprint is applied to a machine learning model that compares the fingerprint to fingerprints of previously processed customer support tickets. One or more related processed customer support tickets are identified based on a predefined similarity metric.

In some embodiments, the disclosed customer support ticket aggregation techniques reduce user bias by taking into account prioritized data source content when analyzing a new customer support issue, as opposed to manual user annotations Among other benefits, the disclosed customer support ticket aggregation techniques enable a scalable investigation of new customer support issues by transforming multiple data sources associated with a new customer support issue into a fingerprint representation. The fingerprint representation is processed by a machine learning model that suggests candidate related customer support ticket that would not likely be identified by a human investigator.

One or more embodiments of the disclosure provide improved methods, apparatus and computer program products for customer support ticket aggregation. The foregoing applications and associated embodiments should be considered as illustrative only, and numerous other embodiments can be configured using the techniques disclosed herein, in a wide variety of different applications.

It should also be understood that the disclosed customer support ticket aggregation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for customer support ticket aggregation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based customer support ticket aggregation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based customer support ticket aggregation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
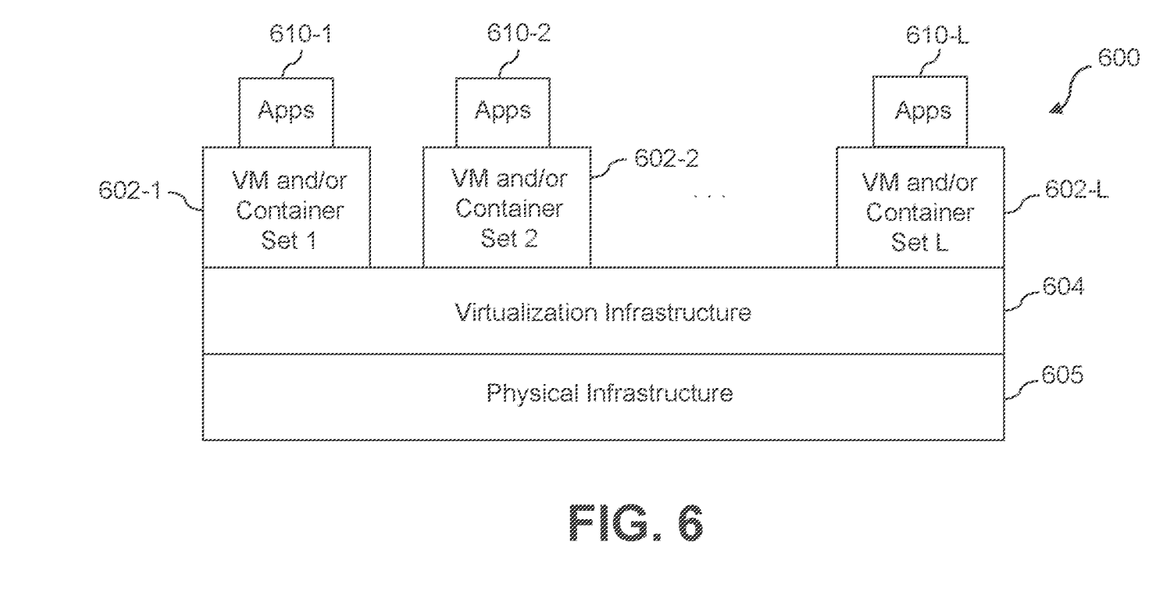
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the exemplary customer support ticket aggregation system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide customer support ticket aggregation functionality of the type described above for one or more processes running on a given one of the VMs. For example, each of the VMs can implement customer support ticket aggregation control logic and an associated corpus of processed customer support tickets 140 for identifying related customer support tickets for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide customer support ticket aggregation functionality of the type described above for one or more processes running on different ones of the containers. For example, a container host device supporting multiple containers of one or more container sets can implement one or more instances of customer support ticket aggregation control logic and an associated corpus of processed customer support tickets 140 for use in identifying related customer support tickets.

As is apparent from the above, one or more of the processing modules or other components of exemplary customer support ticket aggregation system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712.

The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
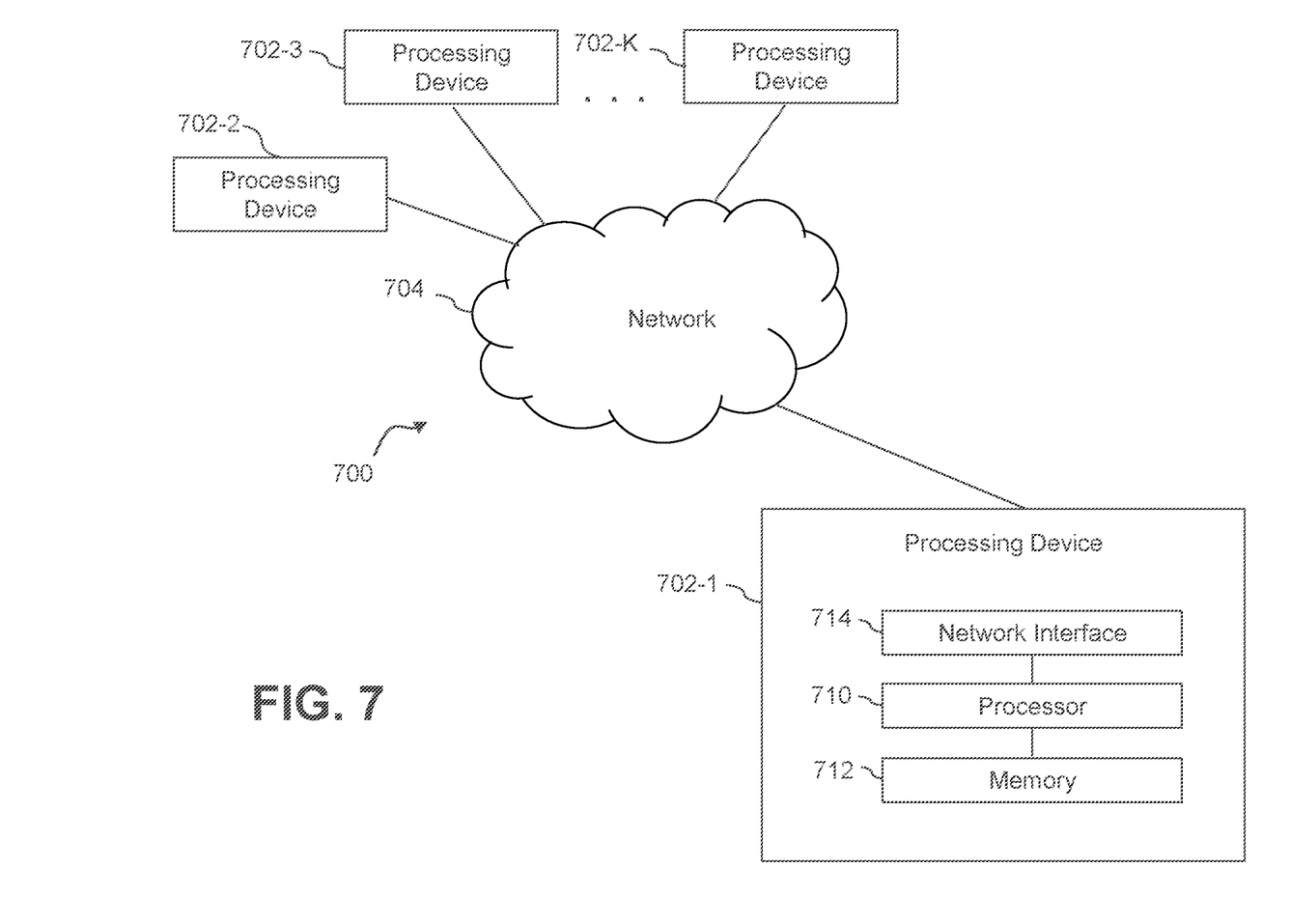
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a first pending customer support ticket under investigation;
extracting, using at least one processing device, a topic of the first pending customer support ticket under investigation using a topic model based on natural language processing techniques;
converting, using at least one processing device, the first pending customer support ticket under investigation to a topic vector representation using the topic model, wherein the topic vector representation identifies the extracted topic and comprises a list of words describing the topic based on a collection of processed customer support tickets, wherein the collection of processed customer support tickets comprises one or more of one or more previously processed customer support tickets and one or more additional pending customer support tickets;
generating, using said at least one processing device, a fingerprint for the first pending customer support ticket under investigation that comprises the topic vector representation and one or more features related to the first pending customer support ticket under investigation;
applying the fingerprint for the first pending customer support ticket under investigation to a machine learning similarity model that compares the fingerprint for the first pending customer support ticket under investigation to fingerprints of processed customer support tickets from the collection of processed customer support tickets, wherein the machine learning similarity model is trained using a supervised learning technique that evaluates at least a subset of the processed customer support tickets to determine a probability that the first pending customer support ticket under investigation is related to one or more processed customer support tickets from the collection of processed customer support tickets, wherein the machine learning similarity model comprises at least first and second neural networks that determine whether at least two applied fingerprints of customer support tickets are related, based on a similarity metric, wherein the first neural network processes the first pending customer support ticket under investigation and wherein the second neural network processes at least some of the collection of processed customer support tickets, and wherein a final layer of the first and second neural networks are applied to a loss function that determines the probability that the first pending customer support ticket under investigation is related to the one or more processed customer support tickets;
identifying at least one processed customer support ticket from the collection of processed customer support tickets that is related to the first pending customer support ticket under investigation, based at least in part on a result of the comparison and a predefined similarity metric;
generating one or more recommendations to address a customer support incident associated with the first pending customer support ticket under investigation using the at least one processed customer support ticket that is related to the first pending customer support ticket under investigation; and
processing the first pending customer support ticket under investigation based at least in part on a processing of one or more of the at least one processed customer support ticket that is related to the first pending customer support ticket under investigation to address the customer support incident using the one or more recommendations, wherein the one or more recommendations one or more of: (i) are based at least in part on a resolution of one or more of the previously processed customer support tickets that are related to the first pending customer support ticket under investigation, and (ii) comprise a recommendation to perform a root cause analysis for the first pending customer support ticket under investigation together with one or more of the additional pending customer support tickets that are related to the first pending customer support ticket under investigation.

2. The method of claim 1, wherein the topic model employs Latent Dirichlet Allocation techniques.

3. The method of claim 1, wherein the topic model distinguishes different words used to describe related incidents.

4. The method of claim 1, wherein the topic model is trained over the collection of processed customer support tickets.

5. The method of claim 1, wherein the first pending customer support ticket under investigation comprises an Information Technology ticket as part of a root cause analysis for one or more Information Technology issues under investigation.

6. The method of claim 1, wherein the one or more extracted features related to the first pending customer support ticket under investigation comprise one or more of a timestamp, a username of a user, additional details of the user, a geo-location of the user, a user site, and a network employed by the user.

7. The method of claim 1, wherein the identified related processed customer support tickets comprise one or more of previously processed customer support tickets and one or more of the additional pending customer support tickets that are processed at substantially the same time as the obtained customer support ticket.

8. The method of claim 1, wherein at least one of the first and second neural networks comprises a Siamese neural network.

9. A system, comprising:
a memory; and
at least one processing device, coupled to the memory, operative to implement the following steps:

obtaining a first pending customer support ticket under investigation;

extracting, using at least one processing device, a topic of the first pending customer support ticket under investigation using a topic model based on natural language processing techniques;

converting, using at least one processing device, the first pending customer support ticket under investigation to a topic vector representation using the topic model, wherein the topic vector representation identifies the extracted topic and comprises a list of words describing the topic based on a collection of processed customer support tickets, wherein the collection of processed customer support tickets comprises one or more of one or more previously processed customer support tickets and one or more additional pending customer support tickets;

generating, using said at least one processing device, a fingerprint for the first pending customer support ticket under investigation that comprises the topic vector representation and one or more features related to the first pending customer support ticket under investigation;

applying the fingerprint for the first pending customer support ticket under investigation to a machine learning similarity model that compares the fingerprint for the first pending customer support ticket under investigation to fingerprints of processed customer support tickets from the collection of processed customer support tickets, wherein the machine learning similarity model is trained using a supervised learning technique that evaluates at least a subset of the processed customer support tickets to determine a probability that the first pending customer support ticket under investigation is related to one or more processed customer support tickets from the collection of processed customer support tickets, wherein the machine learning similarity model comprises at least first and second neural networks that determine whether at least two applied fingerprints of customer support tickets are related, based on a similarity metric, wherein the first neural network processes the first pending customer support ticket under investigation and wherein the second neural network processes at least some of the collection of processed customer support tickets, and wherein a final layer of the first and second neural networks are applied to a loss function that determines the probability that the first pending customer support ticket under investigation is related to the one or more processed customer support tickets;

identifying at least one processed customer support ticket from the collection of processed customer support tickets that is related to the first pending customer support ticket under investigation, based at least in part on a result of the comparison and a predefined similarity metric;

generating one or more recommendations to address a customer support incident associated with the first pending customer support ticket under investigation using the at least one processed customer support ticket that is related to the first pending customer support ticket under investigation; and processing the first pending customer support ticket under investigation based at least in part on a processing of one or more of the at least one processed customer support ticket that is related to the first pending customer support ticket under investigation to address the customer support incident using the one or more recommendations, wherein the one or more recommendations one or more of: (i) are based at least in part on a resolution of one or more of the previously processed customer support tickets that are related to the first pending customer support ticket under investigation, and (ii) comprise a recommendation to perform a root cause analysis for the first pending customer support ticket under investigation together with one or more of the additional pending customer support tickets that are related to the first pending customer support ticket under investigation.

10. The system of claim 9, wherein the topic model distinguishes different words used to describe related incidents.

11. The system of claim 9, wherein the topic model is trained over the collection of processed customer support tickets.

12. The system of claim 9, wherein the first pending customer support ticket under investigation comprises an Information Technology ticket as part of a root cause analysis for one or more Information Technology issues under investigation.

13. The system of claim 9, wherein the identified related processed customer support tickets comprise one or more of previously processed customer support tickets and one or more of the additional pending customer support tickets that are processed at substantially the same time as the obtained customer support ticket.

14. The system of claim 9, wherein the one or more extracted features comprise one or more of a timestamp, a username of a user, additional details of the user, a geolocation of the user, a user site, and a network employed by the user.

15. A computer program product, comprising a non-transitory machine-readable storage medium having encoded therein executable code of one or more software programs, wherein the one or more software programs when executed by at least one processing device perform the following steps:

obtaining a first pending customer support ticket under investigation;

extracting, using at least one processing device, a topic of the first pending customer support ticket under investigation using a topic model based on natural language processing techniques;

converting, using at least one processing device, the first pending customer support ticket under investigation to a topic vector representation using the topic model, wherein the topic vector representation identifies the extracted topic and comprises a list of words describing the topic based on a collection of processed customer support tickets, wherein the collection of processed customer support tickets comprises one or more of one or more previously processed customer support tickets and one or more additional pending customer support tickets;

generating, using said at least one processing device, a fingerprint for the first pending customer support ticket under investigation that comprises the topic vector representation and one or more features related to the first pending customer support ticket under investigation;

applying the fingerprint for the first pending customer support ticket under investigation to a machine learning similarity model that compares the fingerprint for the first pending customer support ticket under investigation to fingerprints of processed customer support tickets from the collection of processed customer support tickets, wherein the machine learning similarity model is trained using a supervised learning technique that evaluates at least a subset of the processed customer support tickets to determine a probability that the first pending customer support ticket under investigation is related to one or more processed customer support tickets from the collection of processed customer support tickets, wherein the machine learning similarity model comprises at least first and second neural networks that determine whether at least two applied fingerprints of customer support tickets are related, based on a similarity metric, wherein the first neural network processes the first pending customer support ticket under investigation and wherein the second neural network processes at least some of the collection of processed customer support tickets, and wherein a final layer of the first and second neural networks are applied to a loss function that determines the probability that the first pending customer support ticket under investigation is related to the one or more processed customer support tickets;

identifying at least one processed customer support ticket from the collection of processed customer support tickets that is related to the first pending customer support ticket under investigation, based at least in part on a result of the comparison and a predefined similarity metric;

generating one or more recommendations to address a customer support incident associated with the first pending customer support ticket under investigation using the at least one processed customer support ticket that is related to the first pending customer support ticket under investigation; and processing the first pending customer support ticket under investigation based at least in part on a processing of one or more of the at least one processed customer support ticket that is related to the first pending customer support ticket under investigation to address the customer support incident using the one or more recommendations, wherein the one or more recommendations one or more of: (i) are based at least in part on a resolution of one or more of the previously processed customer support tickets that are related to the first pending customer support ticket under investigation, and (ii) comprise a recommendation to perform a root cause analysis for the first pending customer support ticket under investigation together with one or more of the additional pending customer support tickets that are related to the first pending customer support ticket under investigation.

16. The computer program product of claim 15, wherein the topic model distinguishes different words used to describe related incidents.

17. The computer program product of claim 15, wherein the topic model is trained over the collection of processed customer support tickets.

18. The computer program product of claim 15, wherein the first pending customer support ticket under investigation comprises an Information Technology ticket as part of a root cause analysis for one or more Information Technology issues under investigation.

19. The computer program product of claim 15, wherein the identified related processed customer support tickets comprise one or more of previously processed customer support tickets and one or more of the additional pending customer support tickets that are processed at substantially the same time as the obtained customer support ticket.

20. The computer program product of claim 15, wherein the topic model employs Latent Dirichlet Allocation techniques.

* * * * *